United States Patent
Roberts

(10) Patent No.: US 9,443,012 B2
(45) Date of Patent: Sep. 13, 2016

(54) METHOD OF DETERMINING HTTP PROCESS INFORMATION

(75) Inventor: Drew Roberts, Baden (CA)

(73) Assignee: NCR Corporation, Duluth, GA (US)

( * ) Notice: Subject to any disclaimer, the term of this patent is extended or adjusted under 35 U.S.C. 154(b) by 524 days.

(21) Appl. No.: 13/362,133

(22) Filed: Jan. 31, 2012

(65) Prior Publication Data

US 2013/0198364 A1     Aug. 1, 2013

(51) Int. Cl.
| G06F 15/173 | (2006.01) |
| G06F 17/30 | (2006.01) |
| G06F 21/60 | (2013.01) |

(52) U.S. Cl.
CPC ....... *G06F 17/30861* (2013.01); *G06F 21/606* (2013.01)

(58) Field of Classification Search
CPC .................. G06F 21/606; G06F 17/30861
USPC ................... 709/217–219, 224–226
See application file for complete search history.

(56) References Cited

U.S. PATENT DOCUMENTS

| 8,595,186 | B1 * | 11/2013 | Mandyam et al. | 707/632 |
| 2002/0188862 | A1 * | 12/2002 | Trethewey et al. | 713/201 |
| 2008/0140841 | A1 * | 6/2008 | Ott | 709/226 |
| 2009/0187991 | A1 * | 7/2009 | Freericks et al. | 726/24 |
| 2009/0199044 | A1 * | 8/2009 | Hurrell | 714/23 |
| 2010/0146500 | A1 * | 6/2010 | Joubert et al. | 717/178 |
| 2010/0223185 | A1 * | 9/2010 | Campbell et al. | 705/44 |
| 2010/0235543 | A1 * | 9/2010 | Gmuender et al. | 709/246 |
| 2012/0054744 | A1 * | 3/2012 | Singh et al. | 718/1 |
| 2014/0173709 | A1 * | 6/2014 | Eldar | G06F 21/31 726/7 |

* cited by examiner

*Primary Examiner* — Abdullahi E Salad
(74) *Attorney, Agent, or Firm* — Paul W. Martin; Schwegman, Lundberg & Woessner

(57) ABSTRACT

A method of determining http process information while executing a secure web application which redirects to a separate an unsecure web application to determine the information and redirect the information back to the secure web application. An example method includes redirecting the web browser software to an unsecure web application for obtaining the information by the computer during execution of the secure application, executing the unsecure web application using the web browser software by the computer to obtain the information about the http process, and redirecting the web browser software to provide the information from the unsecure web application to the secure web application by the computer.

17 Claims, 2 Drawing Sheets

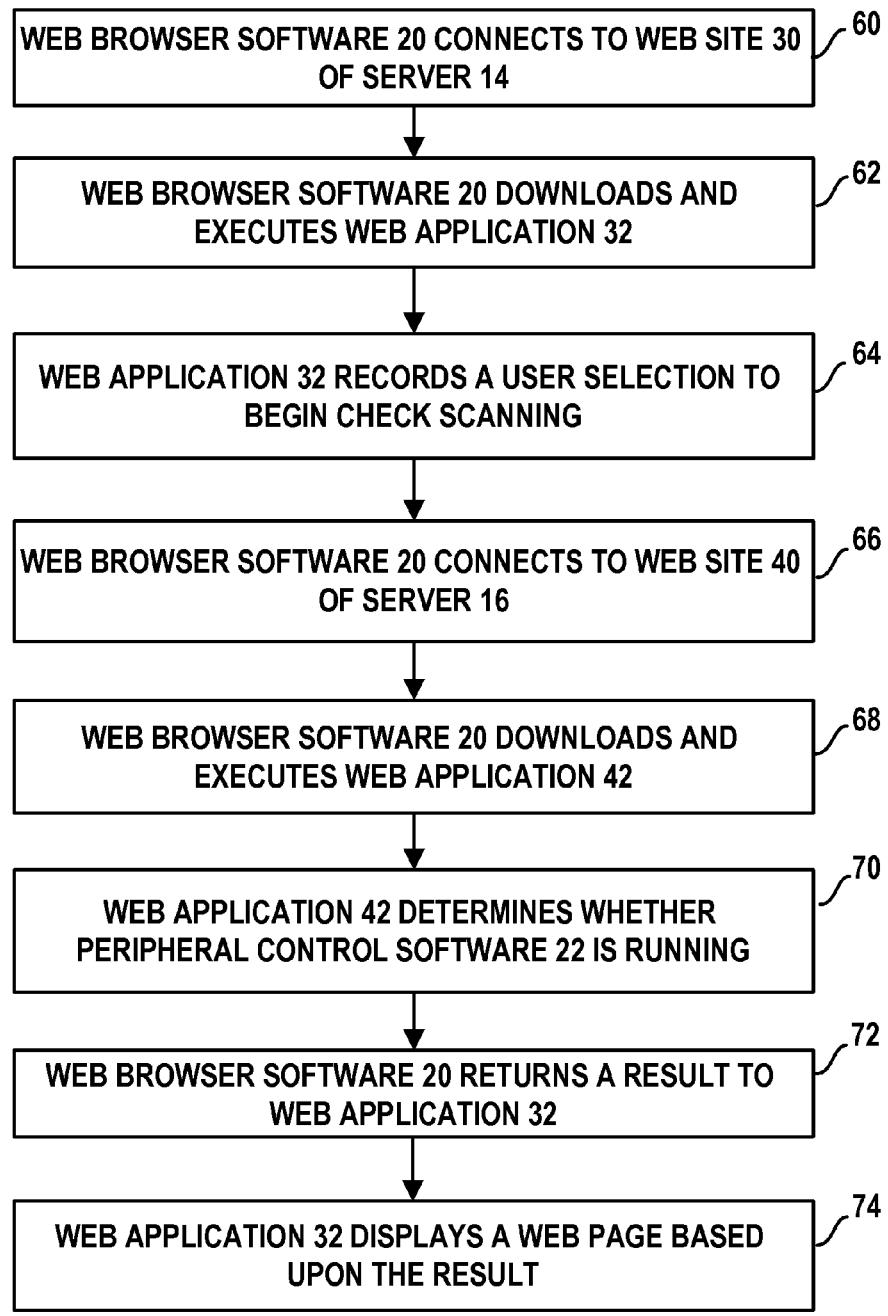

METHOD OF DETERMINING HTTP PROCESS INFORMATION

BACKGROUND

The present invention relates to World Wide Web (WWW or "web") browser software security and web applications, and more specifically, to a method of determining Hypertext Transfer Protocol (HTTP or http) process information.

Some web pages and web content are identified by the prefix, "http", in the Uniform Resource Locator (URL) or web address, indicative of a web site that implements the http. Secure Socket Layer (SSL) and its related protocols are often used to enable encrypted communications between a client computer system and a web server. SSL web pages and web content are identified by the prefix, "https", in the web address, indicative of a web site that implements the Hypertext Transfer Protocol Secure (HTTPS or https). These web sites, including their web pages, web applications, and other web content, are considered to be secure because of encryption, compared to http web sites, which may be considered to be unsecure. However, some SSL web pages may contain "mixed content", i.e., both https and http web content.

Modern web browser software products detect http web content within an https web page and display a "popup" message or prompt to a computer user to either accept the http web content or display only the https web content. This feature can be disabled by the user in web browser software security settings; however, doing so allows the web browser software to display or otherwise provide http web content to a user viewing the https web page.

In general, detection of mixed content is good practice, as maliciously delivered http web content inserted into the Document Object Model (DOM) tree can gain access to the https web content on the web page. For example, web applications that serve http web content with https web content are at risk of having their http web content replaced with malicious content through Domain Name Server (DNS) poisoning.

Despite risks associated with http web content, it may be desirable to include http web content, or participate in some kind of http communication from within an https web application. For example, it may be desirable for an https web application running on a client computer to know the status or availability of one or more running http processes on the client computer. However, execution of http commands by the https web application to determine status information may result in a secure/unsecure "mixed content" prompt from the client web browser software.

Therefore, it would be desirable to determine http process information from within an https web application non-obtrusively, i.e., without resulting in a secure/insecure mixed content prompt from the client web browser software.

SUMMARY

In accordance with the teachings of the present invention, a method of determining http process information is provided.

An example method includes redirecting the web browser software to an unsecure web application separate from the secure web application for obtaining the information about the http process by the computer during execution of the secure web application, executing the unsecure web application using the web browser software by the computer to obtain the information about the http process, and redirecting the web browser software to provide the information from the unsecure web application to the secure web application by the computer.

BRIEF DESCRIPTION OF THE DRAWINGS

FIG. 2 is a flow diagram illustrating an example method of determining http process information.

DETAILED DESCRIPTION

Figure 1:
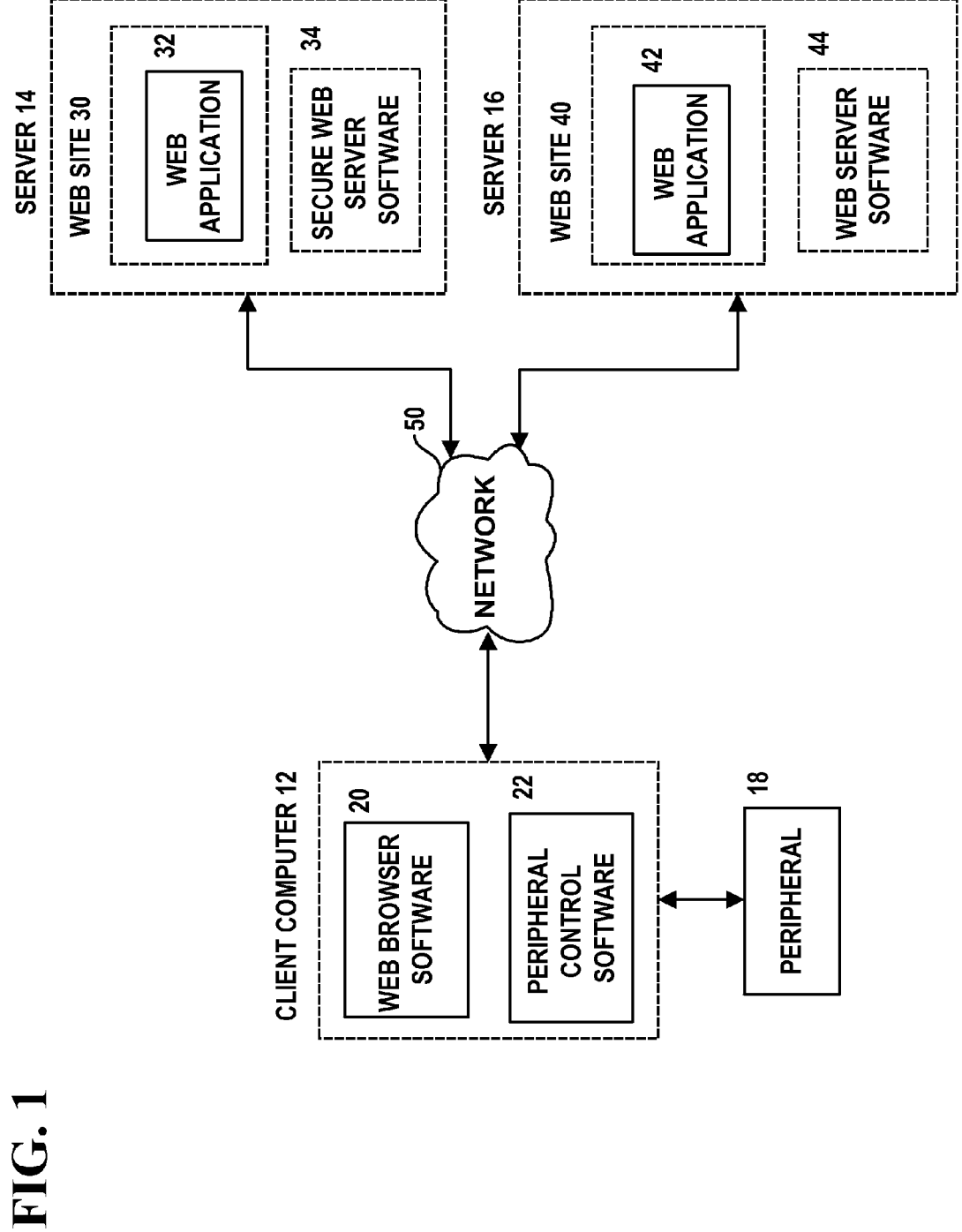
FIG. 1 is a block diagram of an example network system.

Turning now to FIG. 1, example system 10 includes client computer 12 and server 14.

Client computer 12 includes a processor, memory, and program and data storage. Client computer 12 executes an operating system such as a Microsoft operating system. Client computer 12 further includes network circuitry for connecting to network 50, and may include other circuitry for connecting to peripherals, such as a display, a printer, a mouse, and a keyboard.

Client computer 12 executes World Wide Web (WWW or "web") browser software 20 for obtaining and displaying web content, such as web pages and web applications, from web servers connected to network 50, such as servers 14 and 16.

Network 50 may include any combination of wireless or wired networks, including local area, wide area, and global communication networks, such as the Internet.

Web browser software 20 connects to web site 30 of server 14 and downloads web application 32, which is rendered executable by web browser software 20.

Client computer 12 also executes peripheral control software 22 for controlling peripheral 18. Peripheral control software 22 may a client application for facilitating communication with peripheral 18 from within web browser software 20 and web application 32, similar to a driver which facilitates communication between the operating system and peripheral 18. Peripheral control software 22 may be stored locally by client computer 12 or downloaded from server 14.

Server 14 includes a processor, memory, and program and data storage. Server 14 executes an operating system. Server 14 further includes network circuitry for connecting to network 50, and may include other circuitry for connecting to peripherals, such as a display, a printer, a mouse, and a keyboard.

Server 14 executes secure web server software 34 which establishes web site 30 for hosting web application 32. Secure web server software 34 implements the Hypertext Transfer Protocol Secure (HTTPS or https), which provides encrypted communication between client computer 12 and server 14.

Using web browser software 20, client computer 12 connects to web site 30 of server 14 via a Uniform Resource Locator (URL) or web address with an "https" prefix.

In the example embodiment, web application 32 may require knowledge of the execution of certain processes by client computer 12 in order to satisfy its purpose. For example, web application 32 may need to know whether client computer 12 is currently executing peripheral control software 22.

Detection of certain processes by means of http communication is performed by executing a script within an already rendered html web page in web browser software 20. However, if web application 32 attempts to redirect web browser 20 to peripheral control software 22 and peripheral control software 22 is not present, web browser 20 will display a "404—page not found" error to the user. By embedding the script in an already rendered html page, a "404—page not found" error resulting from execution of the script occurs behind the scenes and is not visible to the user.

Web application 32 may perform this check itself, for example, by executing a script including Hypertext Transfer Protocol (HTTP or http) commands. However, web browser software 20 may issue a "secure/insecure mixed content" prompt if web application 32 were to perform the check.

Therefore, web application 32 redirects to web application 42, which is hosted by server 16, to perform the check. Web application 42 sends the http commands to peripheral control software 22. Web application 42 redirects the result of the check back to web application 32. Web application 42 is rendered executable by web browser software 20.

Server 16 includes a processor, memory, and program and data storage. Server 16 executes an operating system. Server 16 further includes network circuitry for connecting to network 50, and may include other circuitry for connecting to peripherals, such as a display, a printer, a mouse, and a keyboard.

Server 16 executes web server software 44 which establishes website 40 for hosting web application 42. Web server software 44 implements the http.

Using web browser software 20, client computer 12 connects to web site 40 during execution of web application 32 via a URL or web address with an http prefix.

In alternative embodiments, server 14 and 16 may include any combination of computers, and may be combined into a single computer that hosts web sites 30 and 40.

Example web applications 32 and 42 may include applets written in a programming language such as the Java programming language and/or scripts written in a scripting language such as the JavaScript scripting language, combined with Hypertext Markup Language (HTML) or other suitable web page language. Web applications 32 and 42 may be stored in a computer readable medium, such as a magnetic storage medium (e.g., magnetic hard disk drive), optical storage medium (e.g., compact or digital video disc), or static read-only memory storage medium (e.g., flash drive).

With reference to FIG. 2, an example method of determining information about an http process, such as peripheral control software 22, is illustrated beginning with step 60. In this example, peripheral control software 22 is a check scanning process, which may be implemented at a client computer 12 in a bank or bank branch or at an external bank customer site. Peripheral 18 is a check scanner under the control of peripheral control software 22. Server 14 may include a secure web server computer within the bank's network infrastructure. Server 16 may include a web server computer within or outside the bank's network infrastructure. Web browser software 20 may execute peripheral control software 22 in advance of, or in connection with execution of web application 32. Web application 32 may implement a banking method or workflow that includes a check scanning step. Web application 42 may be for determining whether peripheral control software 22 is available, i.e., is running, before proceeding with the check scanning step of web application 32.

In step 60, web browser software 20 connects to the web site 30 of server 14. Web browser software 20 may use a URL that has an https prefix and that is associated with web application 32.

In step 62, web browser software 20 downloads and executes web application 32.

In step 64, web application 32 records a user selection to begin check scanning. The user selection includes a hyperlink (or "link") to the URL of web application 42. Thus, web application 32 redirects web browser software 20 to web application 42.

In step 66, web browser software 20 connects to web site 40 of server 16. Web browser software 20 may use a URL that has an http prefix and that is associated with web application 42.

In step 68, web browser software 20 downloads and executes web application 42. Http web content received by web browser software 20 from web application 42 contains a process detection script and redirection logic, including a URL for web application 32, which web browser software 20 uses to redirect the result of the process detection script back to web application 32.

For example, the content of web application 42 may include a JavaScript script and the URL to peripheral control software 22 may look similar to, "http://localhost:80/driverInstalled.js". Peripheral control software 22 may actively listen on port 80 for http requests (somewhat like a local web server). Web browser software 20 interprets the URL by serving the file "driverInstalled.js", which only contains the contents "driverInstalled=true". In web application 42, the variable "driverInstalled" is set to "false" by default, so that only if peripheral control software 22 is running and responds to the request will the value of the variable change.

In step 70, web application 42 determines whether peripheral control software 22 is running on client computer 12 based on the result of execution of the process detection script and the response from web browser software 20.

For example, if peripheral control software 22 is still running, peripheral control software 22 responds to the request for "http://localhost:80/driverInstalled.js", and web browser software 20 responds with "driverInstalled=true". Otherwise, web browser software 20 responds with "driverInstalled=false".

In step 72, web browser software 20 returns a result, which is based on the value of "driverInstalled", to web application 32 using the redirection logic, including the URL of web application 32, within web application 42.

In step 74, web application 32 displays a web page based upon the result. For example, web application 32 may display a web page containing a diagnostic message and/or http links to start/restart peripheral control software 22, if the result is "false". On the other hand, web application 32 may display a web page containing a confirmation message indicating that the check scanning process is running, if the result is "true".

Although the present invention has been described with particular reference to certain preferred embodiments thereof, variations and modifications of the present invention can be effected within the spirit and scope of the following claims.

What is claimed is:

1. A method of non-obtrusively determining information about a hypertext transfer protocol (http) process during execution of a secure web application using web browser software by a computer comprising:

establishing, by the web browser software executing on the computer, a Hypertext Transfer Protocol Secure (HTTPS) connection to a first server and downloading a secure web application for processing within the web browser software as an HTTPS process;

redirecting the web browser software on the direction of the secure web application to a second server for downloading an unsecure web application separate from the secure web application for processing within the web browser, obtaining, by the unsecure web application, the information about the http process by the unsecure web application issuing http commands to the http process that acts as peripheral control software for a peripheral of the computer from within the web browser software and redirecting the web browser software to provide the information from the unsecure web application to the secure web application by the computer for the secure web application to communicate the information with respect to the peripheral within the web browser software.

2. The method of claim 1, wherein the unsecure web application comprises a script for obtaining the information.

3. The method of claim 2, wherein the script communicates with the http process through an http port.

4. The method of claim 2, wherein information comprises whether the http process is running.

5. The method of claim 4, wherein the script comprises a default value of the information which is the http process is not running.

6. The method of claim 1, wherein the secure web application uses the http process to control the peripheral coupled to the computer.

7. The method of claim 1, wherein the step of redirecting the web browser software to the unsecure web application comprises recording user selection of a hyperlink to the unsecure web application using the web browser software by the computer.

8. The method of claim 1, wherein the step of redirecting the web browser software to provide the information to the secure web application comprises following a Uniform Resource Locator link (URL) of the secure web application within the unsecure web application using the web browser software by the computer.

9. The method of claim 1, further comprising:
displaying a web page of the secure web application containing the information using the web browser software by the computer.

10. A method of non-obtrusively determining whether a hypertext transfer protocol (http) process is running by a computer comprising:
establishing, by web browser software executing on the computer, a Hypertext Transfer Protocol Secure (HTTPS) connection to a first server and downloading a secure web application for processing within the web browser software as an HTTPS process;
downloading, by the secure web application, from a second service an unsecure web for processing within the web browser software;
redirecting the web browser software to the unsecure web application separate from the secure web application by the computer in response to user selection of a hyperlink within the secure web application, wherein the hyperlink is directed to accessing a peripheral of the computer controlled by the http process from within the web browser software, and wherein the unsecure web application includes a script for determining whether the http process is running and a Uniform Resource Locator link (URL) of the secure web application;

executing the script using the web browser software by the computer to obtain a result from the http process by the script issuing at least one http command to the http process; and
redirecting the web browser software, using the URL provided from the unsecure web application for the secure web application, to provide the result from the script to the secure web application.

11. The method of claim 10, wherein the script sends a request to the http process through an http port.

12. The method of claim 11, wherein the script comprises a default result that assumes that the http process is not running, and wherein only if the http process responds to the request does the result change from the default result.

13. The method of claim 10, further comprising:
displaying a web page of the secure web application containing the result using the web browser software by the computer.

14. A method of non-obtrusively determining whether a hypertext transfer protocol (http) process for controlling a peripheral is running by a computer comprising:
executing peripheral control software by the computer, wherein the peripheral control software is an http process which listens on a predetermined port for http requests issued from web browser software executing on the computer;
downloading from a first server a secure web application for processing within the web browser software as a Hypertext Transfer Protocol Secure (HTTPS) process;
processing the secure web application for downloading an unsecure web application from a second server and processing the unsecure web application as a second http processes within the web browser software;
processing, by the unsecure web application,
in response to user selection of a hyperlink within the secure web application, and wherein the unsecure web application includes a script;
executing the script using the web browser software by the computer to serve an http request to the peripheral control software through the predetermined port;
redirecting the web browser software to provide a result of the http request to the secure web application using a Uniform Resource Locator link (URL) of the secure web application provided by the unsecure web application; and
displaying a web page of the secure web application that includes the result using the web browser software by the computer and including a link in the web page for restarting the peripheral control software based on the result.

15. The method of claim 14, wherein the script comprises a default result that assumes that the peripheral control software is not running, and wherein only if the peripheral control software responds to the request does the result change from the default result.

16. The method of claim 14, wherein the peripheral comprises a check scanner.

17. A non-transitory computer readable medium including executable program instructions for non-obtrusively determining information about a Hypertext Transfer Protocol (HTTP) process during execution of a secure web application using web browser software by a computer, wherein execution of the program instructions by a processor of a computer system causes the processor to carry out a method, comprising:
downloading, by the web browser software executing on the computer, the secure web application from a first server as an HTTP Secure (HTTPS) process for processing within the web browser software;

downloading, by the secure web application, an unsecure web application as a second HTTP process for processing by the web browser software;

redirecting, by the computer system, the web browser software to the unsecure web application for obtaining the information about the http process during execution of the secure web application while the secure web application is being processed, by the web browser software on the computer, as a the HTTPS process;

executing, by the computer system, the unsecure web application using the web browser software to obtain the information about the http process by the unsecure web application issuing at least one http command to the http process; and redirecting, by the computer system, the web browser software to provide the information from the unsecure web application to the secure web application and displaying, by the secure web application, a web page having a diagnostic message and a link for re-starting peripheral control software based on the information.

* * * * *